United States Patent
Rocher et al.

(10) Patent No.: US 9,935,570 B2
(45) Date of Patent: Apr. 3, 2018

(54) USE OF AN ELECTRONIC DEVICE FOR OPERATING A DC MOTOR TO CONTROL TWO PEAK AND HOLD LOADS

(71) Applicants: CONTINENTAL AUTOMOTIVE FRANCE, Toulouse (FR); CONTINENTAL AUTOMOTIVE GMBH, Hannover (DE)

(72) Inventors: Jacques Rocher, Saint Orens de Gameville (FR); Philippe Avian, Goyrans (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 15/038,644

(22) PCT Filed: Nov. 24, 2014

(86) PCT No.: PCT/EP2014/003131
§ 371 (c)(1),
(2) Date: May 23, 2016

(87) PCT Pub. No.: WO2015/078574
PCT Pub. Date: Jun. 4, 2015

(65) Prior Publication Data
US 2016/0301342 A1    Oct. 13, 2016

(30) Foreign Application Priority Data
Nov. 26, 2013 (FR) ...................... 13 61637

(51) Int. Cl.
*H02P 1/30*     (2006.01)
*H02P 7/03*     (2016.01)
(Continued)

(52) U.S. Cl.
CPC ............... *H02P 7/05* (2016.02); *F02D 41/20* (2013.01); *F02D 41/3005* (2013.01);
(Continued)

(58) Field of Classification Search
CPC .................................. H02P 31/00; H02P 7/05
See application file for complete search history.

(56) References Cited

U.S. PATENT DOCUMENTS

| 2,760,050 A | 8/1956 | Porsche |
| 7,932,777 B1 * | 4/2011 | Zipfel, Jr. ............. H03F 3/2173 330/10 |

(Continued)

FOREIGN PATENT DOCUMENTS

| CN | 10126197 A | 9/2008 |
| CN | 101309063 A | 11/2008 |

(Continued)

OTHER PUBLICATIONS

ST: "VN5772AK-E Quad smart power solid-state relay for complete H-bridge configurations Contents", Sep. 30, 2013 (Sep. 30, 2013), XP055143201, Retrieved from the Internet <URL:http://www.st.com/st-web-ui/static/active/en/resource/technical/document/datasheet/CD00243526.pdf>.

(Continued)

*Primary Examiner* — Karen Masih
(74) *Attorney, Agent, or Firm* — Young & Thompson

(57) ABSTRACT

Electronic device (1), capable of operating a DC motor, including an H bridge with an upper left-hand switch (R1), an upper right-hand switch (R2), a lower left-hand switch (R3) and a lower right-hand switch (R4), the second terminal (R1*b*) of the upper left-hand switch being connected to the second terminal (R3*b*) of the lower left-hand switch, and the second terminal (R2*b*) of the upper right-hand switch being connected to the second terminal of the lower right-hand (Continued)

Figure 1:
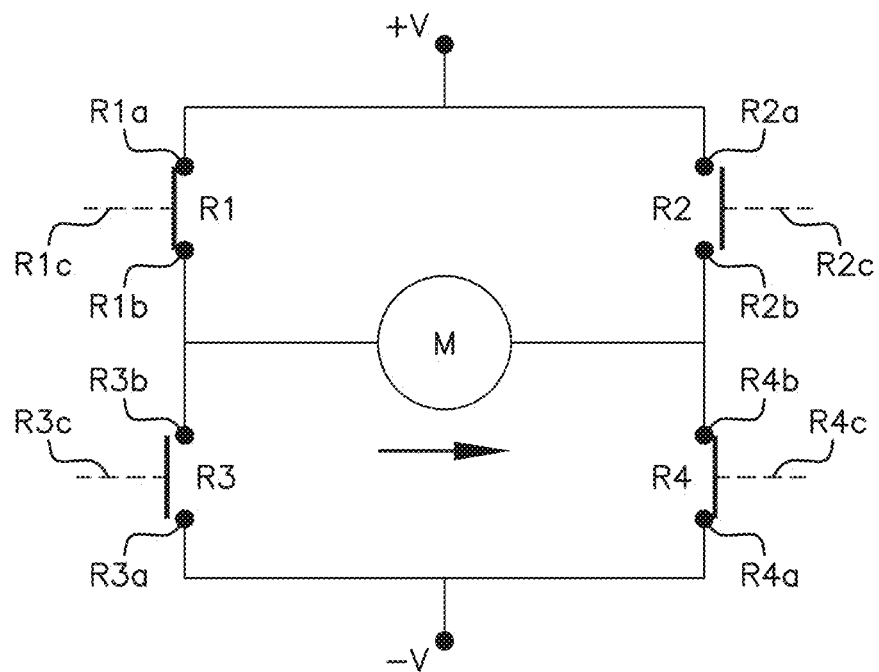

switch, wherein the device is modified by cutting the link between the second terminal of the upper left-hand switch and the second terminal of the lower left-hand switch, and by cutting the link between the second terminal of the upper right-hand switch and the second terminal of the lower right-hand switch.

9 Claims, 4 Drawing Sheets

(51) Int. Cl.
*F02D 41/20* (2006.01)
*H02P 31/00* (2006.01)
*F02D 41/30* (2006.01)

(52) U.S. Cl.
CPC ...... *H02P 31/00* (2013.01); *F02D 2041/2017* (2013.01); *F02D 2041/2024* (2013.01); *F02D 2041/2072* (2013.01)

(56) References Cited

U.S. PATENT DOCUMENTS

| | | |
|---|---|---|
| 2008/0219649 A1 | 9/2008 | Hirata |
| 2008/0284500 A1 | 11/2008 | Chigira |
| 2009/0034300 A1* | 2/2009 | Ito .................. H02M 1/4233 363/17 |

FOREIGN PATENT DOCUMENTS

| | | |
|---|---|---|
| DE | 10 2011 075 867 A1 | 11/2012 |
| EP | 2 662 554 A1 | 11/2013 |
| JP | H10-318783 A | 12/1998 |
| JP | 2004-170304 A | 6/2004 |
| JP | 2007-3278 A | 1/2007 |

OTHER PUBLICATIONS

International Search Report, dated Oct. 13, 2015, from corresponding PCT Application.

* cited by examiner

USE OF AN ELECTRONIC DEVICE FOR OPERATING A DC MOTOR TO CONTROL TWO PEAK AND HOLD LOADS

BACKGROUND OF THE INVENTION

The present invention relates to an electronic device, initially provided for operating a DC motor, and its adaptation to make it capable of operating two loads in "peak and hold" mode (as it is known in English).

DESCRIPTION OF THE RELATED ART

Peak and hold operation can be used, in a known manner, to provide a given current in an inductive load and to hold this current for a specified duration. This is typically done by means of an operating sequence comprising a first, peak, phase in which a DC voltage is applied to the load for a peak period determined so that the desired current is reached, followed, immediately after the peak phase, by a second, hold, phase, during which said previously obtained current is maintained by applying a hold voltage to the load, typically in the form of a pulse width modulated signal. The duration of the hold phase is determined by the duration of the desired presence of said current.

This operation is advantageous in that it allows the precise determination of the duration for which said current is reached or exceeded. Thus a peak and hold operation is conventionally used for operating an inductive load such as a coil actuating a moving member such as a pump or a valve. The given current is then the current that executes an operation on the member, for example by opening it. The duration for which a current greater than the given current is present is thus indicative of the duration of opening of the member. In the case of a valve, the precision of this duration enables the flow rate through it to be precisely determined.

A particular application of this operation is the operation of fuel injectors for internal combustion engines. The duration of an operating sequence, equal to the duration of the peak phase added to the duration of the hold phase, may be directly related to the duration of the presence of a current higher than the opening current, and thus to the amount of fuel injected, the cross section of the injector orifice and the pressure of the fuel supply to the injector being known.

There are existing electronic devices capable of providing peak and hold operation. However, they are still extremely costly, notably because of their limited distribution.

SUMMARY OF THE INVENTION

One object of the present invention is to provide an electronic device capable of providing peak and hold operation, based on an electronic device initially designed to provide DC motor operation, modified according to the invention in order to meet the requirements of this new function. This component, which is already in existence, is much more widely used than electronic devices dedicated to the provision of peak and hold operation, and is less costly.

For this purpose, an electronic device, capable of operating a DC motor, of the type comprising four controlled switches in an H-bridge configuration, an upper left-hand switch having its first terminal connected to a high potential, an upper right-hand switch having its first terminal connected to the high potential, a lower left-hand switch having its first terminal connected to a low potential, a lower right-hand switch having its first terminal connected to the low potential, the second terminal of the upper left-hand switch being connected to the second terminal of the lower left-hand switch, the second terminal of the upper right-hand switch being connected to the second terminal of the lower right-hand switch, is modified by cutting the link between the second terminal of the upper left-hand switch and the second terminal of the lower left-hand switch, so that a first load can be connected between the second terminal of the upper left-hand switch and the second terminal of the lower left-hand switch, and by cutting the link between the second terminal of the upper right-hand switch and the second terminal of the lower right-hand switch so that a second load can be connected between the second terminal of the upper right-hand switch and the second terminal of the lower right-hand switch.

According to another characteristic, the second terminal of the upper left-hand switch and the second terminal of the upper right-hand switch are still connected by two diodes in series, anode to anode, the common point of the two anodes being connected to the low potential.

According to another characteristic, the device further comprises an input terminal block modified to receive a first pulse width modulated operating signal capable of operating the first load, a first enabling signal indicating the start and end of the operation of the first load, a second pulse width modulated operating signal capable of operating the second load, and a second enabling signal indicating the start and end of the operation of the second load, said first operating signal being transmitted to the operating terminal of one of the upper left-hand switch and the lower left-hand switch, said first enabling signal being transmitted to the operating terminal of the other of the upper left-hand switch and the lower left-hand switch, said second operating signal being transmitted to the operating terminal of one of the upper right-hand switch and the lower right-hand switch, and said second enabling signal being transmitted to the operating terminal of the other of the upper right-hand switch and the lower right-hand switch.

The invention further comprises a method for using this electronic device to operate two loads in a peak and hold mode, comprising the following steps: connection of a first load between the second terminal of the upper left-hand switch and the second terminal of the lower left-hand switch, operation by means of a first pulse width modulated operating signal applied to the operating terminal of one of the upper left-hand switch and the lower left-hand switch, operation by means of a first enabling signal applied to the operating terminal of the other of the upper left-hand switch and the lower left-hand switch, connection of a second load between the second terminal of the upper right-hand switch and the second terminal of the lower right-hand switch, operation by means of a second pulse width modulated operating signal applied to the operating terminal of one of the upper right-hand switch and the lower right-hand switch, operation by means of a second enabling signal applied to the operating terminal of the other of the upper right-hand switch and the lower right-hand switch.

According to another characteristic, an operating signal is at the high level from the start of a peak and hold operating sequence and throughout the duration of a peak phase, said duration being determined so as to reach or exceed a given current, and is then modulated throughout the duration of a subsequent hold phase, so as to substantially maintain said current until the end of the operating sequence.

According to another characteristic, an enabling signal is at the high level at least between a point before the start of an operating sequence and a point after the end of the operating sequence.

BRIEF DESCRIPTION OF THE DRAWING FIGURES

Figure 2:
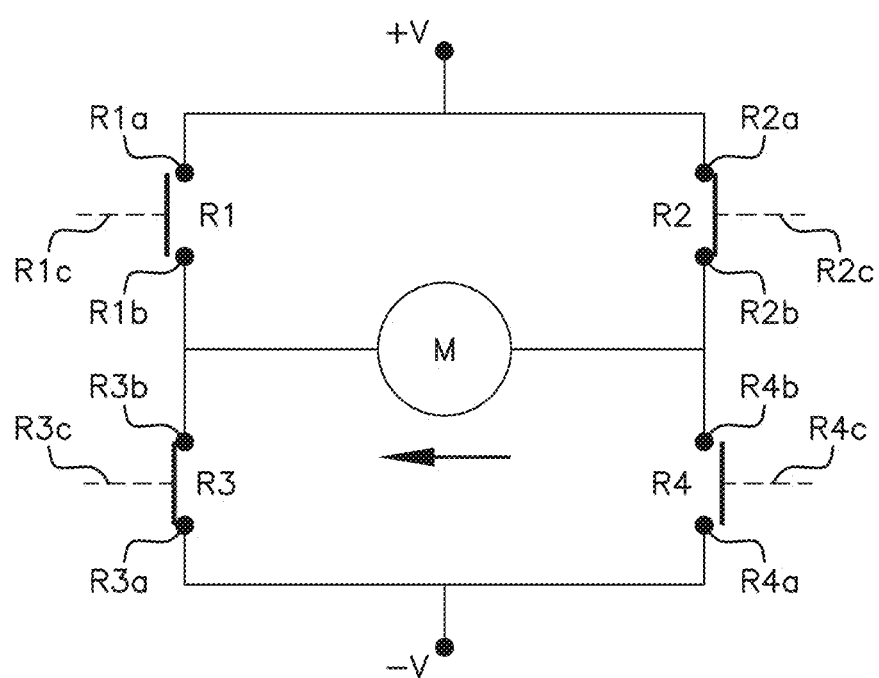
Figure 3:
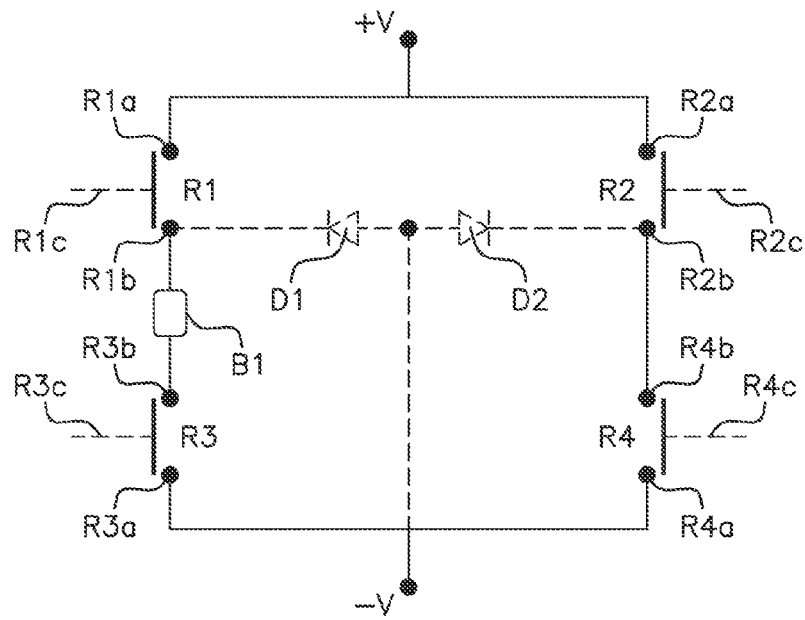
Figure 4:
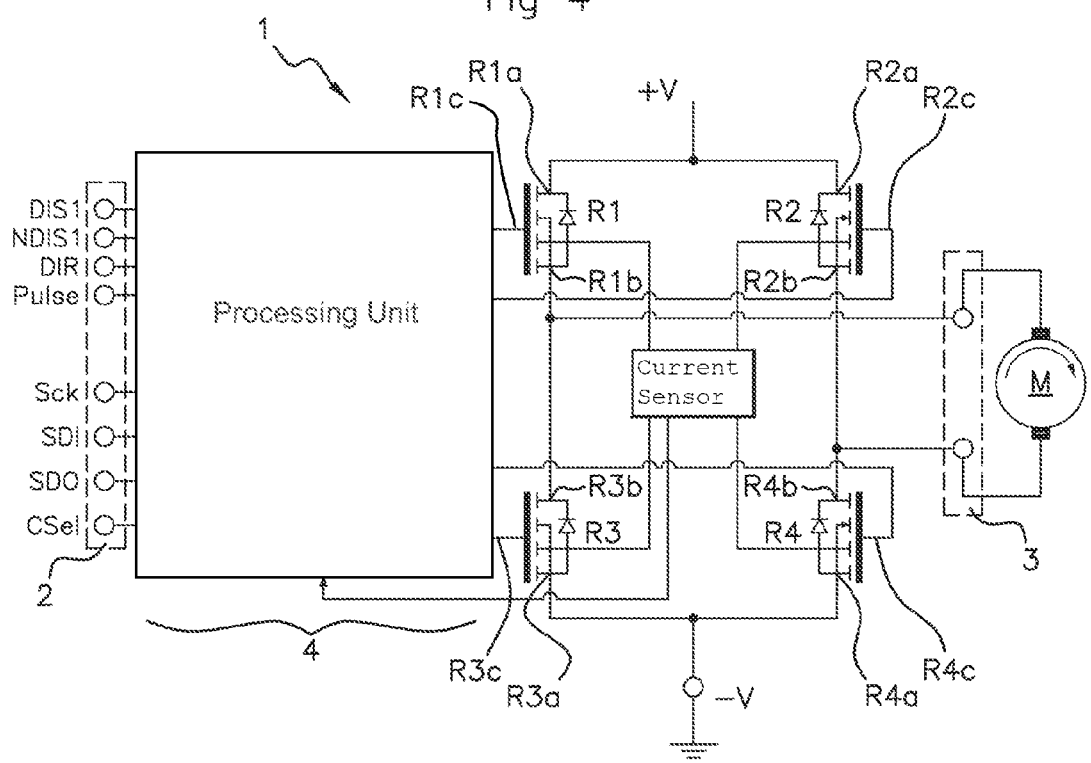
Figure 5:
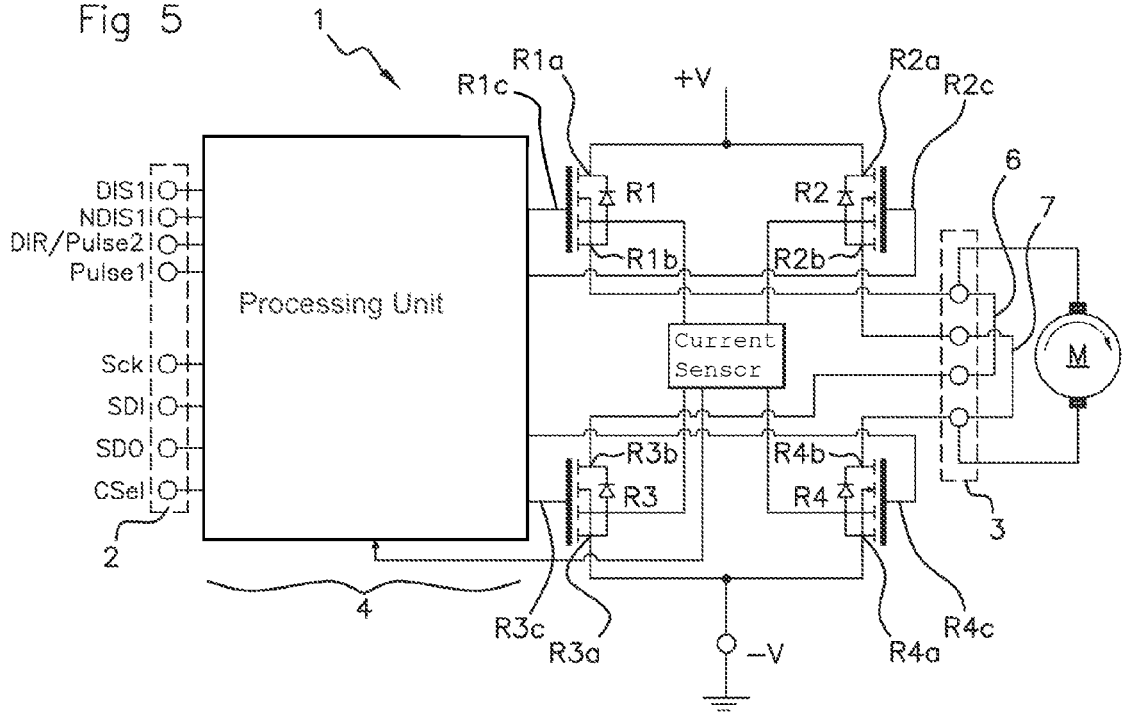
Figure 6:
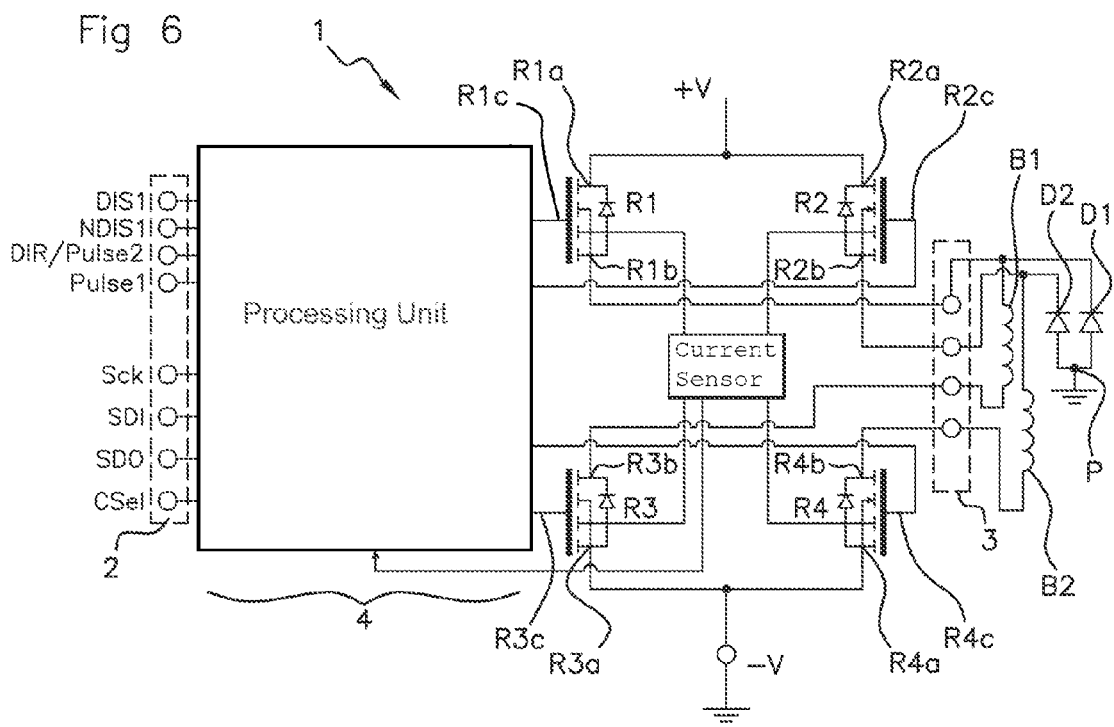
Figure 7:
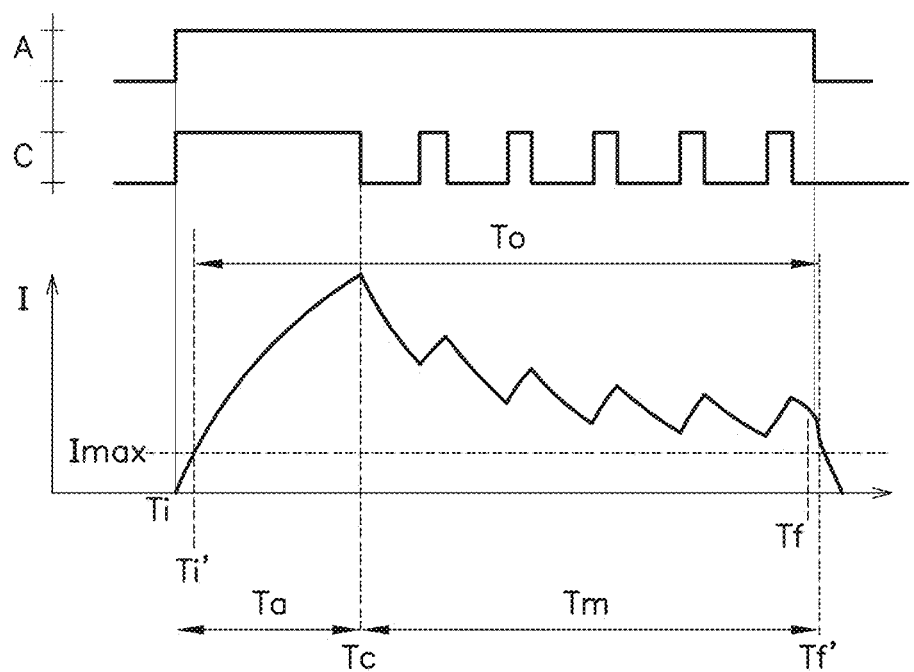

Other characteristics, details and advantages of the invention will be more fully apparent from the detailed description provided below for guidance only, with reference to the drawings, in which:

FIGS. 1 and 2 show, in two synoptic diagrams, the use of an H bridge to operate a DC motor in one direction and in the opposite direction respectively, FIG. 3 shows a synoptic diagram of an H bridge modified to accept two loads, FIG. 4 shows a wiring diagram of an electronic device capable of controlling a DC motor, connected to a DC motor, FIG. 5 shows a wiring diagram of an electronic device capable of controlling a DC motor, modified to accept two loads, connected to a DC motor, FIG. 6 shows a wiring diagram of an electronic device capable of controlling a DC motor, modified to accept two loads, connected to two such loads and equipped with flyback diodes, FIG. 7 shows a peak and hold operation.

DETAILED DESCRIPTION OF THE INVENTION

As shown in FIGS. 1 and 2, an H bridge is an arrangement of four electronic components, generally identical, interconnected by means of connectors forming an H shape. If said four components are four switches R1-R4 placed around a load placed in the central branch of the H, this H bridge is typically used to invert the direction of the voltage at the terminals of the load, in this case a motor M, for example.

For this purpose, each of the four switches R1-R4 comprises a first terminal, generically denoted "a", and a second terminal, generically denoted "b". Thus, for example, the first terminal of the first switch R1 is denoted R1a. The H bridge comprises an upper left-hand switch R1 having its first terminal R1a connected to a high potential +V, an upper right-hand switch R2 having its first terminal R2a connected to the high potential +V, a lower left-hand switch R3 having its first terminal R3a connected to a low potential −V, a lower right-hand switch R4 having its first terminal R4a connected to the low potential −V. Additionally, in the left-hand branch forming a first upright of the H, the second terminal R1b of the upper left-hand switch R1 is connected to the second terminal R3b of the lower left-hand switch R3, and, in the right-hand branch forming a second upright of the H, the second terminal R2b of the upper right-hand switch R2 is connected to the second terminal R4b of the lower right-hand switch R4. The load M is connected between the common point of the second terminal R1b of the upper left-hand switch R1 and the second terminal R3b of the lower left-hand switch R3 and the common point of the second terminal R2b of the upper right-hand switch R2 and the second terminal R4b of the lower right-hand switch R4, thus forming the crossbar of the H.

Thus, as shown in FIG. 1, when the upper left-hand switch R1 and the lower right-hand switch R4 are closed while the other two switches R2, R3 are open, the load M is subjected to a potential difference in a first direction. Conversely, as shown in FIG. 2, when the upper right-hand switch R2 and the lower left-hand switch R3 are closed while the other two switches R1, R4 are open, the load M is subjected to the same potential difference, but in a second direction, opposed to the previous first direction.

An electronic device 1 capable of operating a DC motor M typically comprises an H bridge comprising four switches R1-R4 of this type. Additionally, these switches R1-R4 can be operated, and comprise a supplementary operating terminal generically denoted "c". These operable switches R1-R4 take the form of transistors, for example.

In a known way, this device 1 is used to operate a DC motor M by means of two signals, namely a signal indicating the torque and a signal indicating the direction of rotation. The direction of rotation signal is typically a binary signal having two states, a first state being associated with a first direction of rotation, this first state providing operation in said first direction of rotation, while a second state is associated with a second direction of rotation, opposed to the first, this second state providing operation in said second direction of rotation. The electronic device 1 is capable of analyzing the direction signal and configuring the H bridge accordingly. For a first direction of rotation, a first diagonal pair of switches R1 and R4, or R2 and R3, is used. It is assumed that the direction of operation corresponds to the diagonal pair R1 and R4. The switches R2 and R3 of the other diagonal pair are kept open by absence of operation. The torque signal is then used to operate at least one of the two switches R1 and/or R4 and thus apply the torque signal to the motor M in a first direction. The torque signal is conventionally a pulse width modulated binary signal. This torque signal is applied to the operating terminal "c" of one of the two switches R1 and R4 in such a way that this switch is closed when said torque signal is in the high state. At the same time, the other of the two switches R1 and R4 is operated so as to be closed at least when the first switch is closed. This can be done by a second signal having a high state at least whenever the torque signal is in the low state. Thus this second signal is, at least, identical to the torque signal, and, at most, identical to a constant signal at high level. Thus the load M is subjected to a potential difference according to a timing chart whose shape matches the torque signal.

When the direction signal changes its value, the diagonal pair of switches R1, R4 is replaced by the other diagonal pair of switches R2, R3. The switch R2 is operated by the signal which previously operated the switch R1, and the switch R3 is operated by the signal which previously operated the switch R4.

As shown in FIG. 4, this electronic device 1 for operating a DC motor M thus typically comprises this H bridge comprising four controlled switches R1-R4, an output terminal block 3 used for connecting the load M and typically comprising two terminals, and an input terminal block 2 capable of receiving at least a direction signal, called "DIR" in this case, and a torque signal, called "Pulse" in this case. Typically, it also comprises a processing unit 4 capable of controlling the configuration of the H bridge, by choosing the pair of switches used on the basis of the direction signal, and by performing switching, decoding or processing operations on the input signals. Thus, said processing unit 4 is capable of decoding the direction signal and choosing a bridge configuration accordingly, switching the torque signal toward the adapted switch or switches R1-R4, or creating or adapting the second signal, etc. This processing unit 4 can be operated/configured by means of binary control signals or alternatively by means of a bus capable of transmitting commands and parameters. In this case, an SPI bus is shown, with interface signals Sck, SDI, SDO, CSel.

This electronic device 1 is not initially suitable for use in providing peak and hold operation. However, according to a particularly ingenious discovery made by the inventor, it can be made suitable for this use, subject to modification.

As shown in FIGS. 5 and 6, this modification comprises a number of operations.

A first modification operation, applicable to the H bridge itself, consists in cutting the link between the second terminal R1b of the upper left-hand switch R1 and the second terminal R3b of the lower left-hand switch R3. These two terminals R1b, R3b are initially linked and form a vertical branch of the H. A first terminal of the motor M is connected at this point in the initial device. Since this connection is typically provided by an integrated circuit, an internal modification of said integrated circuit is required. This modification is typically accompanied by taking the output of each of the two terminals R1b, R3b, which are now separated, to a modified output terminal block 3, as shown in FIGS. 5 and 6. This terminal block 3 is thus indicative of the modified pin configuration of the integrated circuit.

Thus, as shown in FIG. 6, it becomes possible to connect a first load B1, for example an inductive load, to be operated in peak and hold mode, between the second terminal R1b of the upper left-hand switch R1 and the second terminal R3b of the lower left-hand switch R3.

The first operation also comprises, in a similar manner, the cutting of the link in the right-hand vertical branch between the second terminal R2b of the upper right-hand switch R2 and the second terminal R4b of the lower right-hand switch R4. In the initial device, a second terminal of the motor M is connected at the cutting point. This modification is typically accompanied by taking the output of each of the two terminals R2b, R4b, which are now separated, to a modified output terminal block 3, as shown in FIGS. 5 and 6.

Thus, as shown in FIG. 6, it becomes possible to connect a first load B2, for example an inductive load, to be operated in peak and hold mode, between the second terminal R2b of the upper right-hand switch R2 and the second terminal R4b of the lower right-hand switch R4.

The output terminal block 3 is thus modified in that it changes from two to four points. The initial two points are a common point R1b/R3B and a common point R2B/R4b for connecting the two terminals of the motor M. The doubling of these two points provides four points. After modification, the four points are R1b, R3b, R2b and R4b, allowing a first load B1 to be connected between R1b and R3b and allowing a second load B2 to be connected between R2b and R4b.

FIG. 3 shows a schematic diagram of this arrangement.

It should be noted here that, advantageously, this modification does not prevent the control of a motor M. As shown in FIG. 5, with the new four-point terminal block 3 it is still possible to connect a motor M between the point R1b or the point R3b and the point R2b or point R4b, and to add a shunt 6 between the points R1b and R3b and a shunt 7 between the points R2b and R4b, to reproduce the initial wiring.

Thus an electronic device 1 for operating a DC motor M can be used to produce an electronic device 1 capable of operating one or two loads B1, B2 in peak and hold mode in a completely independent manner. A second load is not essential in any way, and the modified device may be used to control a single load B1 or B2 in peak and hold mode. For the purpose of rationalization, however, two loads B1, B2 can be operated by a single modified electronic device 1. In an application of the operation of injectors for internal combustion engines, this is advantageous in that the number of controlled injectors is usually even.

The modification may comprise a second operation. In order to facilitate correct operation in use for controlling two loads B1, B2 in peak and hold mode, it is preferable to add a flyback diode D1, D2 to each of the circuits of each of the loads B1, B2. This is illustrated in greater detail in FIG. 6. This is done, for the first load B1, by connecting the second terminal R1b of the upper left-hand switch R1 to the low potential −V via a first diode D1 arranged so that its anode is connected to the low potential −V. Similarly, for the second load B2, the second terminal R2b of the upper right-hand switch R2 is connected to the low potential −V via a second diode D2 arranged so that its anode is connected to the low potential −V. In other words, the second terminal R1b of the upper left-hand switch R1 and the second terminal R2b of the upper right-hand switch R2 are connected by two diodes D1, D2, mounted in series, in line and anode to anode, and the common point P of the two anodes is connected to the low potential −V.

This optional operation of adding flyback diodes D1, D2 is indicated in broken lines in the schematic diagram of FIG. 3.

A diode D1, D2 of this type can be used to demagnetize the energy stored in a load B1, B2 at the end of the operation, at the end Tf of an operating sequence TC, if the current I in this load B1, B2 is to be cut off. When the application of a voltage ceases, the load B1, B2 produces an inverse voltage and acts as a generator. The diode D1, D2, in parallel with the load B1, B2, then allows the conduction of current, which then flows from the load B1, B2 into the diode D1, D2. The conduction of the diode D1, D2 enables the voltage across the terminals of the load to be limited to approximately 0.7 V. In the absence of this diode D1, D2, the load B1, B2 would produce an overvoltage at its terminals, creating a breakdown current in the recently opened switches R1-R4.

The signals required to control one or two loads B1, B2 in peak and hold mode are different in type and number from the signals used to control a DC motor M. Thus the input terminal block 2 should be modified to make it capable of receiving these signals.

Each of the loads B1, B2 can be controlled by means of two signals, namely an operating signal C1, C2 and an enabling signal A1, A2. Thus the modified input terminal block 2 is capable of receiving a first operating signal C1 and a second enabling signal A1 used to control the first load B1 and a second operating signal C2 and a second enabling signal A2 used to control the second load B2. An operating signal C1, C2 is used in relation with an enabling signal A1, A2 associated therewith, to provide peak and hold operation of a load B1, B2. Since the two loads B1, B2 are operated independently, the pair of first signals C1, A1 is completely independent of the pair of second signals C2, A2.

An operating signal C1, C2 is a signal containing the operating information required to provide peak and hold operation. It is typically a signal which is pulse width modulated (abbreviated to PWM, from the English "pulse width modulated"), that is to say a signal having two states, namely a high and a low state, the information being contained and represented by the instants and durations (pulse width) for which the signal is in the high state.

An enabling signal A1, A2 is a signal having two states, namely a low and a high state, the information being temporal and being contained in the instants when the signal is in the high state, or in the instants when the signal changes state.

As shown in FIG. 7, the aim of peak and hold operation is to create a graph of current I having the shape shown on the third line of the diagram, in a typically inductive load B1, B2. This curve I is characterized by operating sequences TC, one of which is shown, for each interval in which a member is operated. This member is, for example, a valve associated with the load B1, B2, which in this case may be an actuating coil B1, B2 of said valve. During the part of an operating sequence TC where the current I is greater than an actuating current Imax, that is to say between the instants Ti' and Tf', the valve is operated, to set it to the open position for example. For the rest of the time, the valve is not operated, and is in the rest position, for example in the closed position. Thus the operation alternates phases of non-operation, where the applied voltage is substantially zero, with operating sequences TC.

An operating sequence TC of this type, as shown in FIG. 7, comprises a first peak phase. During this phase, which starts at the initial instant Ti, a voltage is applied continuously to the load B1, B2, so that the current I reaches and exceeds the desired current Imax as quickly as possible. For this purpose, the voltage is applied during a peak duration Ta. At the end of the peak phase and of this peak duration Ta, that is to say at the instant Tc, it is assumed that the current Imax has been reached or exceeded in the load B1, B2. A hold phase follows the peak phase. During this hold phase, from the instant Tc to the final instant Tf, the voltage is applied by operating in pulse width modulation mode, so as to simply maintain a current I at least equal to the current Imax reached previously. Modulation of the voltage is sufficient to provide simple compensation for the reductions in current I due to the progressive discharge of the load B1, B2. This hold phase is continued, by applying the voltage modulated in this way to maintain the current, for a hold time Tm which is as long as desired. The hold phase then stops at the final instant Tf, and the applied voltage returns to zero, soon followed by the current I which returns to a level below the current Imax at the instant Tf' before reaching zero.

In order to apply the voltage profile of an operating sequence TC as described above to the load B1, B2, an operating signal C1, C2, similar to the generic signal C on the second line of FIG. 7, is used together with an enabling signal A1, A2 which is associated with it, and which is similar to the generic signal A on the first line of FIG. 7. In the modified arrangement, a load B1, B2 is connected between two associated switches, namely the two left-hand switches R1 and R3 for the load B1, and the two right-hand switches R2 and R4 for the load B2.

For each load B1, B2, the operating signal C1, C2 is used to control one of the two associated switches via its operating terminal "c", and the enabling signal A1, A2 is used to control the other of the two associated switches, via its operating terminal "c". Thus, for the first load B1 placed between the associated left-hand switches R1 and R3, the first operating signal C1 is sent to the operating terminal R1c of the switch R1 and the first enabling signal A1 is sent to the operating terminal R3c of the switch R3, or, conversely, the first operating signal C1 is sent to the operating terminal R3c of the switch R3 and the first enabling signal A1 is sent to the operating terminal R1c of the switch R1.

The procedure is similar for the second load B2 with the second operating signal C2 and enabling signal A2 and the switches R2 and R4.

A load B1, B2 is subjected to a voltage, equal in this case to the difference between the high potential +V and the low potential −V, when its two associated switches are both closed, that is to say when the operating signal C1, C2 and the associated enabling signal A1, A2 are simultaneously in the high state.

Thus, according to one embodiment, the operating signal C1, C2 comprises the pulse width modulated signal corresponding to an operating sequence TC, as shown in curve C of FIG. 7. At the same time, the enabling signal A1, A2 is in the high state at least for the duration of said operating sequence TC, that is to say between the initial instant Ti and the final instant Tf.

According to one embodiment which is useful because of its simplicity, the enabling signal A1, A2 is permanently in the high state.

According to an alternative embodiment, the enabling signal A1, A2 is equal to the operating signal C1, C2.

According to an alternative embodiment, the enabling signal A1, A2 is used for the precise control of the timing of the peak and hold operation, since it can be used to precisely determine the initial instant Ti of an operating sequence TC and the final instant Tf of an operating sequence TC, and consequently the important variable which is the duration of the operating sequence TC, equal to the peak duration Ta added to the hold duration Tm, this being the variable that precisely determines the variable to be controlled in a precise manner, namely the opening duration To for which a current I, greater than the current Imax, flows through the load B1, B2, that is to say between the instant Tf' and the instant Ti'.

Thus, with reference to FIG. 7, the final instant Tf of an operating sequence TC is determined by the last return to zero of the operating signal C1, C2, or by the return to zero of the enabling signal A1, A2, on the first of these two events that occurs. Thus it is possible to use an operating signal C1, C2 comprising determined operating sequences of constant length and/or shape, which are easier to produce, and to vary the instant of the end of operation Tf by means of the enabling signal A1, A2 which is easier to modify. The same applies to the determination of the initial instant Ti, determined by the instant of the first rising edge of an operating sequence TC carried by the operating signal C1, C2. By using the enabling signal A1, A2 in this case also, this signal having a rising edge which is delayed relative to the first rising edge of the operating signal C1, C2, it is possible, to a certain degree, to delay the peak start instant Ti and thus the temporal positioning of the interval To where a current Imax flows through the load B1, B2.

Thus, it is possible, for example, to provide "coarse" operation by means of an operating signal C1, C2 having operating sequences TC which are identical (with the same shape and length) and periodic, and are thus easy to construct and correct temporally by a "fine" operation performed by means of the enabling signal A1, A2 which can be used both to delay the initial instant Ti of each operating sequence TC and to determine the actual final instant Tf of each operating sequence TC, and thus to determine its actual duration.

The invention claimed is:

1. An electronic device (1), capable of operating a DC motor (M), of the type comprising four controlled switches (R1-R4) in an H-bridge configuration, an upper left-hand switch (R1) having its first terminal (R1a) connected to a high potential (+V), an upper right-hand switch (R2) having its first terminal (R2a) connected to the high potential (+V), a lower left-hand switch (R3) having its first terminal (R3a) connected to a low potential (−V), a lower right-hand switch (R4) having its first terminal (R4a) connected to the low potential (−V), the second terminal (R1b) of the upper left-hand switch (R1) being connected to the second terminal (R3b) of the lower left-hand switch (R3), the second terminal (R2b) of the upper right-hand switch (R2) being connected to the second terminal (R4b) of the lower right-hand switch (R4), wherein the device is modified by cutting the link between the second terminal (R1b) of the upper left-hand switch (R1) and the second terminal (R3b) of the lower left-hand switch (R3), so that a first load (B1) can be connected between the second terminal (R1b) of the upper left-hand switch (R1) and the second terminal (R3b) of the lower left-hand switch (R3), and by cutting the link between the second terminal (R2b) of the upper right-hand switch (R2) and the second terminal (R4b) of the lower right-hand switch (R4), so that a second load (B2) can be connected between the second terminal (R2b) of the upper right-hand switch (R2) and the second terminal (R4b) of the lower right-hand switch (R4).

2. The device (1) as claimed in claim 1, wherein the second terminal (R1b) of the upper left-hand switch (R1) and the second terminal (R2b) of the upper right-hand switch (R2) are also connected by two diodes (D1, D2), mounted in series, anode to anode, and the common point (P) of the two anodes is connected to the low potential (−V).

3. The device (1) as claimed in claim 1, further comprising an input terminal block (2) modified to receive a first pulse width modulated operating signal (C1) capable of operating the first load (B1), a first enabling signal (A1) indicating the start and end of the operation of the first load (B1), a second pulse width modulated operating signal (C2) capable of operating the second load (B2), and a second enabling signal (A2) indicating the start and end of the operation of the second load (B2), wherein said first operating signal (C1) is transmitted to the operating terminal (R1c, R3c) of one of the upper left-hand switch (R1) and the lower left-hand switch (R3), said first enabling signal (A1) is transmitted to the operating terminal (R1c, R3c) of the other of the upper left-hand switch (R1) and the lower left-hand switch (R3), said second operating signal (C2) is transmitted to the operating terminal (R2c, R4c) of one of the upper right-hand switch (R2) and the lower right-hand switch (R4), and said second enabling signal (A2) is transmitted to the operating terminal (R2c, R4c) of the other of the upper right-hand switch (R2) and the lower right-hand switch (R4).

4. A method for using an electronic device as claimed in claim 1 for operating two loads (B1, B2) in a peak and hold mode, comprising the steps of:
connecting a first load (B1) between the second terminal (R1b) of the upper left-hand switch (R1) and the second terminal (R3b) of the lower left-hand switch (R3),
operating by means of a first pulse width modulated operating signal (C1) applied to the operating terminal (R1c, R3c) of one of the upper left-hand switch (R1) and the lower left-hand switch (R3),
operating by means of a first enabling signal (A1) applied to the operating terminal (R1c, R3c) of the other of the upper left-hand switch (R1) and the lower left-hand switch (R3),
connecting a second load (B2) between the second terminal (R2b) of the upper right-hand switch (R2) and the second terminal (R4b) of the lower right-hand switch (R4),
operating by means of a second pulse width modulated operating signal (C2) applied to the operating terminal (R2c, R4c) of one of the upper right-hand switch (R2) and the lower right-hand switch (R4),
operating by means of a second enabling signal (A2) applied to the operating terminal (R2c, R4c) of the other of the upper right-hand switch (R2) and the lower right-hand switch (R4).

5. The method as claimed in claim 4, wherein an operating signal (C1, C2) is at the high level from the start (Ti) of a peak and hold operating sequence (TC) and throughout the duration (Ta) of a peak phase, said duration (Ta) being determined so as to reach or exceed a given current (Imax), and is then modulated throughout the duration (Tm) of a subsequent hold phase, so as to substantially maintain said current (Imax) until the end (Tf) of the operating sequence (TC).

6. The method as claimed in claim 5, wherein an enabling signal (A1, A2) is at the high level at least between a point before the start (Ti) of an operating sequence (TC) and a point after the end (Tf) of the operating sequence (TC).

7. The device (1) as claimed in 2, further comprising an input terminal block (2) modified to receive a first pulse width modulated operating signal (C1) capable of operating the first load (B1), a first enabling signal (A1) indicating the start and end of the operation of the first load (B1), a second pulse width modulated operating signal (C2) capable of operating the second load (B2), and a second enabling signal (A2) indicating the start and end of the operation of the second load (B2), wherein said first operating signal (C1) is transmitted to the operating terminal (R1c, R3c) of one of the upper left-hand switch (R1) and the lower left-hand switch (R3), said first enabling signal (A1) is transmitted to the operating terminal (R1c, R3c) of the other of the upper left-hand switch (R1) and the lower left-hand switch (R3), said second operating signal (C2) is transmitted to the operating terminal (R2c, R4c) of one of the upper right-hand switch (R2) and the lower right-hand switch (R4), and said second enabling signal (A2) is transmitted to the operating terminal (R2c, R4c) of the other of the upper right-hand switch (R2) and the lower right-hand switch (R4).

8. A method for using an electronic device as claimed in claim 2 for operating two loads (B1, B2) in a peak and hold mode, comprising the steps of:
connecting a first load (B1) between the second terminal (R1b) of the upper left-hand switch (R1) and the second terminal (R3b) of the lower left-hand switch (R3),
operating by means of a first pulse width modulated operating signal (C1) applied to the operating terminal (R1c, R3c) of one of the upper left-hand switch (R1) and the lower left-hand switch (R3),
operating by means of a first enabling signal (A1) applied to the operating terminal (R1c, R3c) of the other of the upper left-hand switch (R1) and the lower left-hand switch (R3),
connecting a second load (B2) between the second terminal (R2b) of the upper right-hand switch (R2) and the second terminal (R4b) of the lower right-hand switch (R4),
operating by means of a second pulse width modulated operating signal (C2) applied to the operating terminal (R2c, R4c) of one of the upper right-hand switch (R2) and the lower right-hand switch (R4),
operating by means of a second enabling signal (A2) applied to the operating terminal (R2c, R4c) of the other of the upper right-hand switch (R2) and the lower right-hand switch (R4).

9. A method for using an electronic device as claimed in claim 3 for operating two loads (B1, B2) in a peak and hold mode, comprising the steps of:
connecting a first load (B1) between the second terminal (R1b) of the upper left-hand switch (R1) and the second terminal (R3b) of the lower left-hand switch (R3),
operating by means of a first pulse width modulated operating signal (C1) applied to the operating terminal (R1*c*, R3*c*) of one of the upper left-hand switch (R1) and the lower left-hand switch (R3), operating by means of a first enabling signal (A1) applied to the operating terminal (R1*c*, R3*c*) of the other of the upper left-hand switch (R1) and the lower left-hand switch (R3), connecting a second load (B2) between the second terminal (R2*b*) of the upper right-hand switch (R2) and the second terminal (R4*b*) of the lower right-hand switch (R4), operating by means of a second pulse width modulated operating signal (C2) applied to the operating terminal (R2*c*, R4*c*) of one of the upper right-hand switch (R2) and the lower right-hand switch (R4), operating by means of a second enabling signal (A2) applied to the operating terminal (R2*c*, R4*c*) of the other of the upper right-hand switch (R2) and the lower right-hand switch (R4).

* * * * *